United States Patent [19]

Bronikowski

[11] 4,456,942

[45] Jun. 26, 1984

[54] GAPLESS ELBOW ARRESTER

[75] Inventor: Raymond J. Bronikowski, South Milwaukee, Wis.

[73] Assignee: RTE Corporation, Waukesha, Wis.

[21] Appl. No.: 930,662

[22] Filed: Aug. 2, 1978

[51] Int. Cl.$^3$ .......... H02H 9/04

[52] U.S. Cl. .......... 361/127

[58] Field of Search .......... 361/127, 128, 126, 130

[56] References Cited

U.S. PATENT DOCUMENTS

| | | | |
|---|---|---|---|
| 2,050,334 | 8/1936 | Kellogg | 361/121 |
| 2,298,114 | 10/1942 | Estorff | 361/130 X |
| 3,733,521 | 5/1973 | Kalb | 361/130 |
| 4,100,588 | 7/1978 | Kresge | 361/127 |
| 4,161,012 | 7/1979 | Cunningham | 361/128 |

FOREIGN PATENT DOCUMENTS

| | | | |
|---|---|---|---|
| 1118510 | 7/1968 | United Kingdom | 361/130 |

*Primary Examiner*—Jr. Moose

*Attorney, Agent, or Firm*—Ronald E. Barry

[57] ABSTRACT

An elastomeric insulated fully shielded arrester including one or more surge arrester blocks mounted within an elastomeric housing having a layer of conductive material on the outer surface thereof, an electrically conductive contact at each end of the arrester block, the elastomeric housing providing a compressive force for maintaining electrical communication between the electrical contacts and the block or blocks and closely engaging the outer surface of the block or blocks to minimize corona discharge.

1 Claim, 5 Drawing Figures

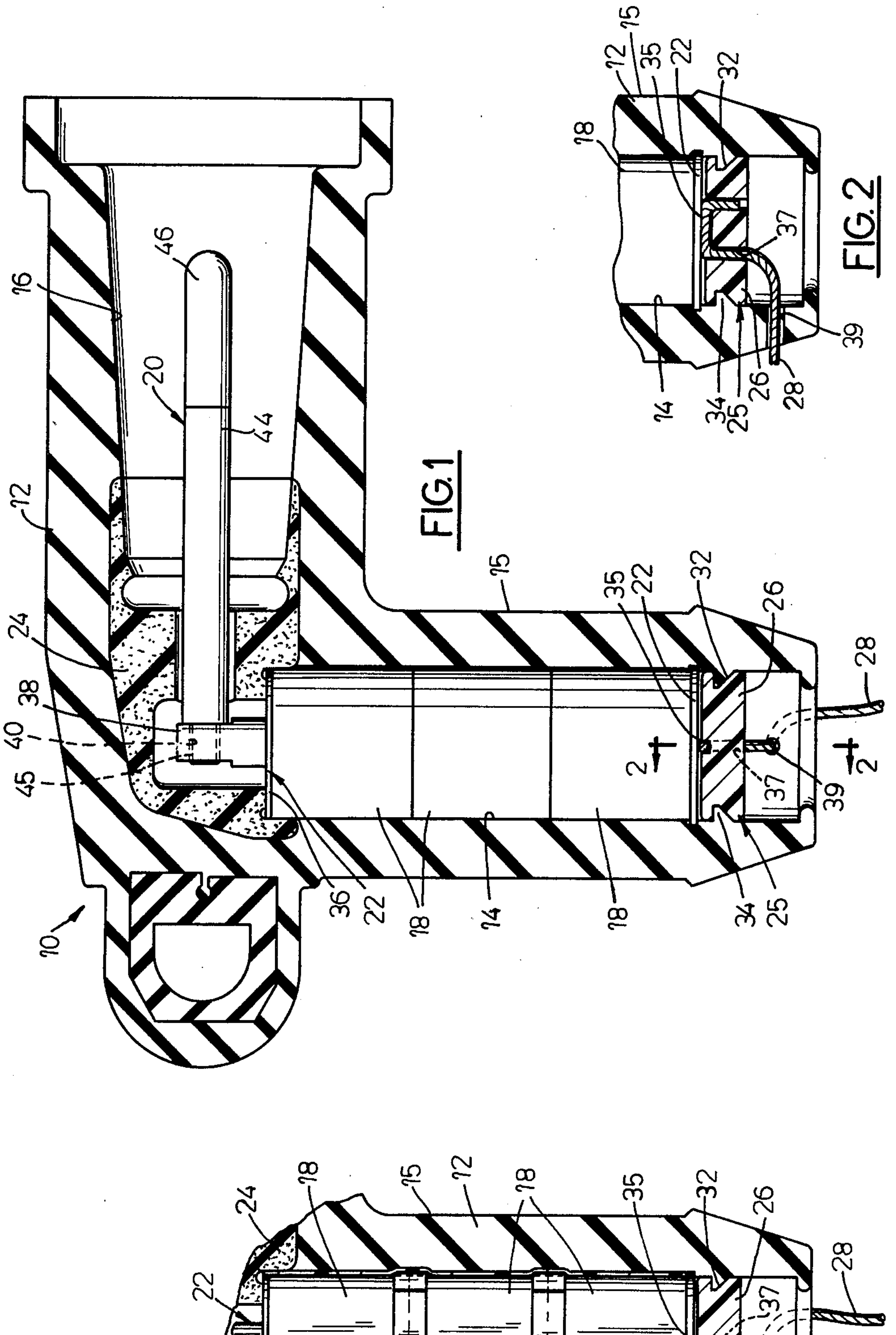
FIG.1
FIG.2
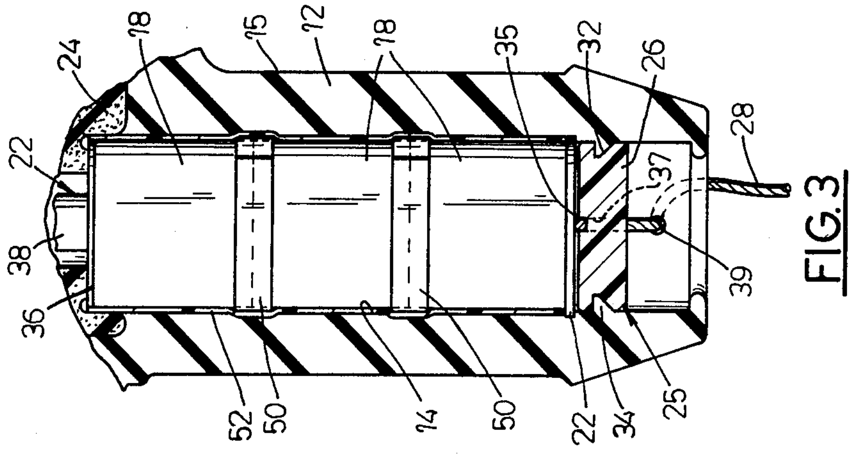
FIG.3

GAPLESS ELBOW ARRESTER

BACKGROUND OF INVENTION

Contemporary plug-in arresters for underground systems must have barriers to prevent accidental contact by a lineman or surface person. This contact may or may not produce a serious electrical shock, but it is a safety hazard to have energized parts exposed. Shielded gap type arresters have their gap sections shielded and the whole arrester encased in rubber with the outer portion protected by a conductive shield. The arrester assembly is in turn cable connected to an elbow connector for attachment to appropriate equipment bushing.

SUMMARY OF INVENTION

The elastomeric insulated fully shielded arrester according to the present invention provides a combination plug-in dead front lightning surge arrester in a single housing. The arrester is provided with an elastomeric housing which cushions and protects the ceramic parts from damage under adverse conditions. The use of elastomeric material also eliminates the possibility of explosion which can occur with a ceramic type arrester. The inherent resiliency of elastomeric housing also makes it possible to virtually eliminate corona discharge by providing circumferential compression of the blocks within the housing. The length of the recess within the housing can also be shortened so that the housing is stretched in order to accomodate the blocks, thus providing a longitudinal force to compress the blocks, thus maintaining electrical communication between the blocks to eliminate possible block splash over.

DRAWINGS

FIG. 1 is a side view partly in section showing the surge arrester according to the present invention.

FIG. 2 is a view taken along line 2—2 of FIG. 1 showing the ground connection to the surge arrester blocks.

FIG. 3 is a view of an alternate form of arrester with the arrester blocks inbedded within a rubber shield.

DETAILED DESCRIPTION OF INVENTION

Figure 5:
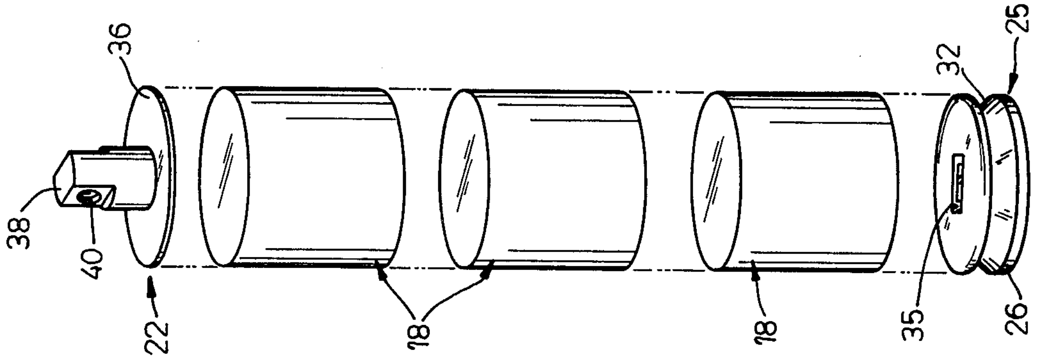
FIG. 5 is an exploded view of the surge blocks showing the contact assemblies for each end of the surge blocks.

Referring to FIGS. 1 and 2 of the drawings, one form of the shielded surge arrester according to the present invention is shown and generally includes an elastomeric housing 12 having a first cylindrical recess 14 at one end and a second conical recess 16 at the other end. The housing 12 is shielded by means of a conductive coating 15 or another surface of semi-conductive rubber. A number of surge arrester blocks 18 are positioned in the first recess 14 with first means provided at the internal end of the blocks for connecting the blocks 18 to a probe contact assembly 20 and second means provided at the open end of the recess 14 for connecting the blocks to ground. The innermost end of the blocks 18 can be shrouded by means of a conductive rubber insert 24 molded in the housing to prevent any corona discharge.

The surge arrester blocks are preferably a metal oxide varister, including zinc oxide nonlinear resistors. Although three blocks are shown in the housing, it should be noted that the number of blocks depends on the voltage rating of each block and the required rating for the arrester. Three −3 kV zinc oxide non linear resistors provide a 9/10 kV arrester, five provide a 15 kV, seven a 21 kV, etc.

The first means for connecting the internal end of the blocks to the probe contact assembly 20 as seen in FIG. 5 is in the form of a disc contact and terminal assembly 22. This assembly includes a disk 36 and a terminal nut 38 having a threaded contact apperture 40. The second means is in the form of a ground plug 25 including an end plug 26 and a ground wire 28. The end plug including an angular groove 32 and a central slot 35. The ground wire 28 being positioned in the central slot 35 and extending through an aperture 37 in the plug 26 and the aperture 39 in the housing 12 for connection to ground.

Corona discharge from the surface of the blocks 18 is reduced or eliminated by means of the compressive force of the resilient elastomeric housing 12 which tightly embraces the blocks 18. In this regard the inside diameter of the recess 14 is formed slightly smaller than the outside diameter of the arrester blocks 18. An interference fit is thereby provided between the inside surface of the recess 14 and the outside surface of the blocks, thus eliminating any air spaces within the recess 14.

The arrester blocks 18 are also placed under an axial compressive force by means of the resiliency of the elastomeric housing 12 to hold or maintain the blocks in tight engagement with the contact disk 36. This is accomplished by providing a shorter length to the recess 14 then the total length of a number of blocks to be used in the arrester. The blocks 18 are inserted into the recess 14 and the housing stretched to overlap the end of the blocks. Means are provided at the open end of the recess 14 to apply the compressive force of the housing to the end of the outer most block.

Such means as seen in FIG. 1 is in the form of the end plug 26 which engages the flange 34 provided at the end of the recess 14. The flange 34 is an integral part of the housing and extends radially inwardly into the recess 14. The end plug 26 is forced into the recess until the flange 34 seats in the groove 32 provided in the outer periphery of the end plug 26. The end plug thus providing a dual function in holding the surge blocks in engagement with the contact plate 36 as well as engagement of the ground wire 28 with the end of the block 18.

After the surge blocks have been seated in the recess 14 and the end plug 26 pushed into position the contact or probe assembly 20 is secured to the terminal nut 38. As seen in FIG. 1, the contact assembly 20 includes an electrically conductive probe 44 having a threaded portion 45 at one end and an arc quenching follower 46 at the other end. The threaded portion 45 is turned into the threaded aperture 40 provided in the terminal nut 38.

If the arrester is to be used at higher voltage, i.e. 15 kV and above means can be provided within the recess to provide corona grading between the ends of the blocks 18. In the alternate embodiment of the invention shown in FIG. 3 such means for corona grading the ends of the blocks is in the form of corona shields 50. The shields are formed by conductive tape wrapped around the junction of the surge blocks. A shrink tube cover 52 can also be provided to cover the surface of the surge blocks in order to grade the electric field between the blocks and the insulating dielectric of the housing 12.

Figure 4:
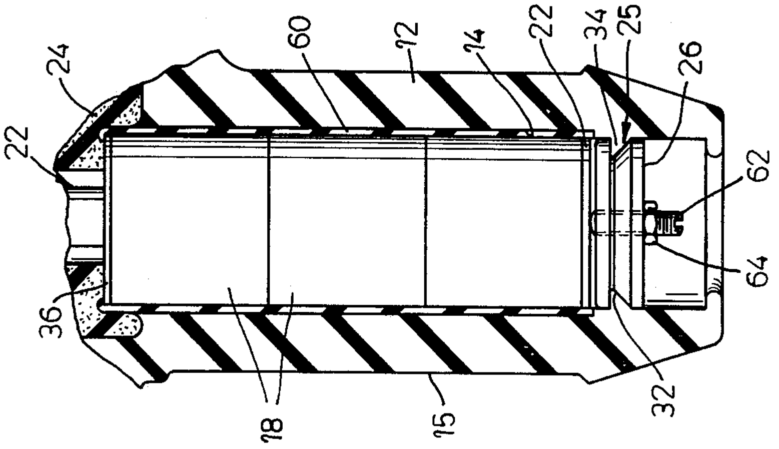
FIG. 4 is another view of an alternate form of the arrester with the surge blocks enclosed within a rubber housing.

In the embodiment of the invention shown in FIG. 4 another means of suppressing corona discharge is shown. Such means is in the form of a filler 60 provided in the recess 14 between the housing 12 and the surge blocks 18. In this embodiment of the invention, the diameter of the recess 14 is made slightly larger than the outside diameter of the surge blocks. After the surge blocks have been placed in the recess the space can be filled with a silicone rubber or urethane rubber which will solidify and closely conform to any discontinuities in the block surfaces thereby eliminating any corona discharge.

In FIG. 4, an alternate form of electrical connecting means is shown for terminating the end of the surge arrester blocks. Such means is in the form of a stud 62 and a terminating nut 64.

The surge arrester can also be used in a high voltage line by providing electrical connections at each end. In this regard contact disk assemblies 22 of the type shown in FIG. 5 could be provided at each end of the blocks with a corresponding probe or receptical for connection to a cable at each end of the arrester.

In some instances, means may be provided for solidly interconnecting the surge arrester blocks. Such means may be in the form of conductive resin or solder.

Although the arrester has been discribed throughout the application as including an electrically conductive coating on the outer surface, in some instances it may not be required. In this regard, when used in a voltage regulator, the shield might be eliminated.

RESUME

The arrestor, according to the present invention, or in the inherent bias of the resilient elastomeric housing material used to bias to voltage sensitive blocks into end-to-end electrical engagement. In one embodiment of the invention, corona is eliminated by filling the recess in the housing with a liquid material that solidifies in the open annular space around the arrestor blocks. Any further embodiment and overhanging shroud of conductive material is provided at the inner end of the arrestor blocks to suppress potential corona discharge from the highly stressed portion of the arrestor block stack. Voltage grading between arrestor blocks is achieved by wrapping conductive tape around the gap between the arrestor blocks.

The embodiments of the invention in which an exclusive property or privilege is claimed are defined as follows:

1. A high voltage gapless arrester comprising
   an elastomeric housing having a recess at one end,
   a number of arrester blocks in said recess,
   an electrical connector at each end of said blocks,
   means maintaining an axial compressive force on said blocks,
   electrically insulating filler means in said recess for filling discontinuities in the surfaces of the arrester blocks,
   means for corona grading the ends of the blocks, said corona grading means comprising
   a conductive tape wrapped around the junction between the surge blocks, and
   a conductive shield on the outside surface of said housing for connection to ground.

* * * * *

UNITED STATES PATENT AND TRADEMARK OFFICE

CERTIFICATE OF CORRECTION

PATENT NO. : 4,456,942

DATED : June 26, 1984

INVENTOR(S) : Raymond J. Bronikowski

It is certified that error appears in the above-identified patent and that said Letters Patent is hereby corrected as shown below:

Column 1, line 35, change "splash" to ---flash---;

Column 3, line 26, change "receptical" to ---receptacle---;

Column 3, line 31, change "discribed" to ---described---.

Signed and Sealed this

*Sixth* Day of *November 1984*

[SEAL]

*Attest:*

GERALD J. MOSSINGHOFF

*Attesting Officer*

*Commissioner of Patents and Trademarks*